United States Patent
van Straaten

(10) Patent No.: US 8,564,985 B2
(45) Date of Patent: Oct. 22, 2013

(54) CHARGE PUMP VOLTAGE CONVERTER WITH CHARGING CURRENT LIMITING

(75) Inventor: Bram van Straaten, Best (NL)

(73) Assignee: NXP B.V., Eindhoven (NL)

( * ) Notice: Subject to any disclaimer, the term of this patent is extended or adjusted under 35 U.S.C. 154(b) by 429 days.

(21) Appl. No.: 13/088,628

(22) Filed: Apr. 18, 2011

(65) Prior Publication Data

US 2011/0254529 A1 Oct. 20, 2011

(30) Foreign Application Priority Data

Apr. 19, 2010 (EP) .................................... 10160287

(51) Int. Cl.
*H02M 3/07* (2006.01)
(52) U.S. Cl.
USPC ............................... 363/60; 363/65
(58) Field of Classification Search
USPC ................................. 363/59, 60, 65
See application file for complete search history.

(56) References Cited

U.S. PATENT DOCUMENTS

| | | | |
|---|---|---|---|
| 5,280,420 A * | 1/1994 | Rapp | 363/60 |
| 5,969,961 A * | 10/1999 | Yero | 363/60 |
| 6,157,243 A | 12/2000 | Tailliet | |
| 6,483,377 B2 | 11/2002 | White et al. | |
| 6,483,728 B1 * | 11/2002 | Johnson et al. | 363/60 |
| 7,266,002 B2 * | 9/2007 | Zhang et al. | 363/60 |
| 2002/0030534 A1 | 3/2002 | Myono | |
| 2008/0013349 A1 * | 1/2008 | Yanagida et al. | 363/60 |
| 2011/0254529 A1 * | 10/2011 | van Straaten | 323/311 |

FOREIGN PATENT DOCUMENTS

EP 1 408 604 A1 4/2004
WO 2007/008202 A1 1/2007

OTHER PUBLICATIONS

Extended European Search Report for European Patent Appln. 10160287.8 (Sep. 14, 2010).

* cited by examiner

*Primary Examiner* — Jeffrey Sterrett

(57) ABSTRACT

A voltage converter comprises at least two capacitive charge pump stages, each comprising a capacitor, a charging switch through which a capacitor charging current is adapted to flow, and a control circuit for controlling the charging switch. wherein the control circuit for at least one charge pump stage comprises current limiting means for limiting the current through the charging switch. By limiting the current flowing through the switch, current spikes are avoided, which reduces high frequency distortion.

14 Claims, 5 Drawing Sheets

CHARGE PUMP VOLTAGE CONVERTER WITH CHARGING CURRENT LIMITING

CROSS-REFERENCE TO RELATED APPLICATIONS

This application claims the priority under 35 U.S.C. §119 of European patent application no. 10160287.8, filed on Apr. 19, 2010, the contents of which are incorporated by reference herein.

The invention relates to a voltage converter for converting an input voltage to an output voltage.

In present IC-technologies, there is a strong drive to improve the efficiency of the power systems, in order to obtain the maximum operation time out of one or more batteries.

The voltage generated by the battery is often not at the required level, so a voltage to voltage conversion is needed. To minimise losses, this conversion (either up or down) is mostly done by means of a DC/DC converter. Either a coil or a set of capacitors can be used.

This invention relates particularly to a DC/DC converter using capacitors as the conversion mechanism.

A capacitive voltage up-converter uses a charge pump operation. A voltage converter may have several charge pump stages arranged in cascade. A charge storage element of the first stage is charged upon a switching event of a driver driving the first stage. A further switching element at the output of the first stage (which may be the input to the next stage) is open in this case.

The output switching element is then closed so that the charge may be supplied to the next stage. The charge storage element of the subsequent stage is then charged upon a switching event of a driver driving the subsequent stage. Thus, a charge stored in the first stage is forwarded to one or more subsequent stages, where it is added to the charge of such a subsequent stage, so that a higher voltage is generated and can be provided to a device.

An advantage of using charge pumps is that generally no additional bypass switches are needed and a voltage converter can thus be relatively simply constructed. A driver commands the charge storage elements and may be operated by periodic signals or phases.

When converting the supply voltage from the (battery) supply level to local supply level using this type of capacitive charge pump circuit, electrical charge is stored in the capacitor of the charge pump stage in a short time span. Next, this charge is transferred onto the local supply again in a short time span. This fast charging and de-charging of the capacitor results in momentary high current peaks and, as a consequence, high voltage supply peaks on both the battery and local supply.

The high current and voltage peaks described above, are present in a very short time span. As a result they will have a very high frequency content, with a lot of higher harmonics of the capacitor switching frequency. The final result is that both the battery and the local supply are polluted with harmonic frequencies of the switching frequency. This pollution is characterised by a large number of frequency components that have a high amplitude.

The consequence is twofold:
 the disturbance will self-pollute the chip using this DC/DC converter resulting in loss of performance or even become completely non-functional.
 the high frequency disturbance will radiate resulting in EMC problems in the environment.

According to the invention, there is provided a voltage converter comprising at least two capacitive charge pump stages, each comprising a capacitor, a charging switch through which a capacitor charging current is adapted to flow, and a control circuit for controlling the charging switch, wherein the control circuit for at least one charge pump stage comprises current limiting means for limiting the current through the charging switch.

By limiting the current flowing through the switch, current spikes are avoided, which reduces high frequency distortion. The current is limited such that the capacitor can still charge to the desired voltage within the available time period, but the initial charging is slowed.

In one arrangement, the charging switch is a transistor, and the current limiting means is for limiting the current flowing to or from the gate of the charging switch, thereby to limit the switching speed of the signal applied to the gate.

This arrangement controls the switching behaviour of the charging switches associated with the capacitors. By relatively slowly switching on the charging switch (i.e. slowly changing the switch resistance from high to low) the currents running through the switch are smoothed out as much as possible. As a result, the high current peaks, normally present, are removed. As a result the pollution and EMC problems are significantly reduced. This reduction can make the difference between acceptability and non-functionality.

The slow switch on is slow enough to reduce spikes, but still enables the switching function to be correctly implemented. For example, the control circuit applies a periodic signal to the gate of the charging switch which alternates between an on command and an off command. The gate voltage preferably takes at least 10% of the duration of the on command to reach 90% of its target value. Preferably, the gate voltage takes less than 50% of the duration of the on command to reach 90% of its target value. Thus, the gate voltage does reach its desired level quickly with the available time period so that charge transfer can take place, but there is a slow initial phase in the ramping of the gate voltage. The effect of this slow turn on is that the peak current to the capacitor preferably arises after 10% of the time of the on period, for example between 30% and 70% of the on period.

Preferably, the control circuit comprises an inverter having first and second opposite type transistors in series between high and low control lines, with their control terminals connected together and with the node between the transistors coupled to the gate of the charging switch. The current limiting means can then comprise a first current limiter between the high control line and the first transistor and a second current limiter between the low control line and the second transistor.

The invention also provides a driving circuit for a battery operated device, comprising a voltage converter of the invention, and also provides a battery operated device using this driving circuit.

The invention also provides a voltage conversion method comprising:

operating at least two capacitive charge pump stages, each comprising a capacitor, a charging switch through which a capacitor charging current is adapted to flow, and a control circuit for controlling the charging switch, wherein the method comprises limiting the current through the charging switch.

Preferred embodiments of the invention will now be described in a detailed description with reference to the accompanying drawings, in which.

Figure 1:
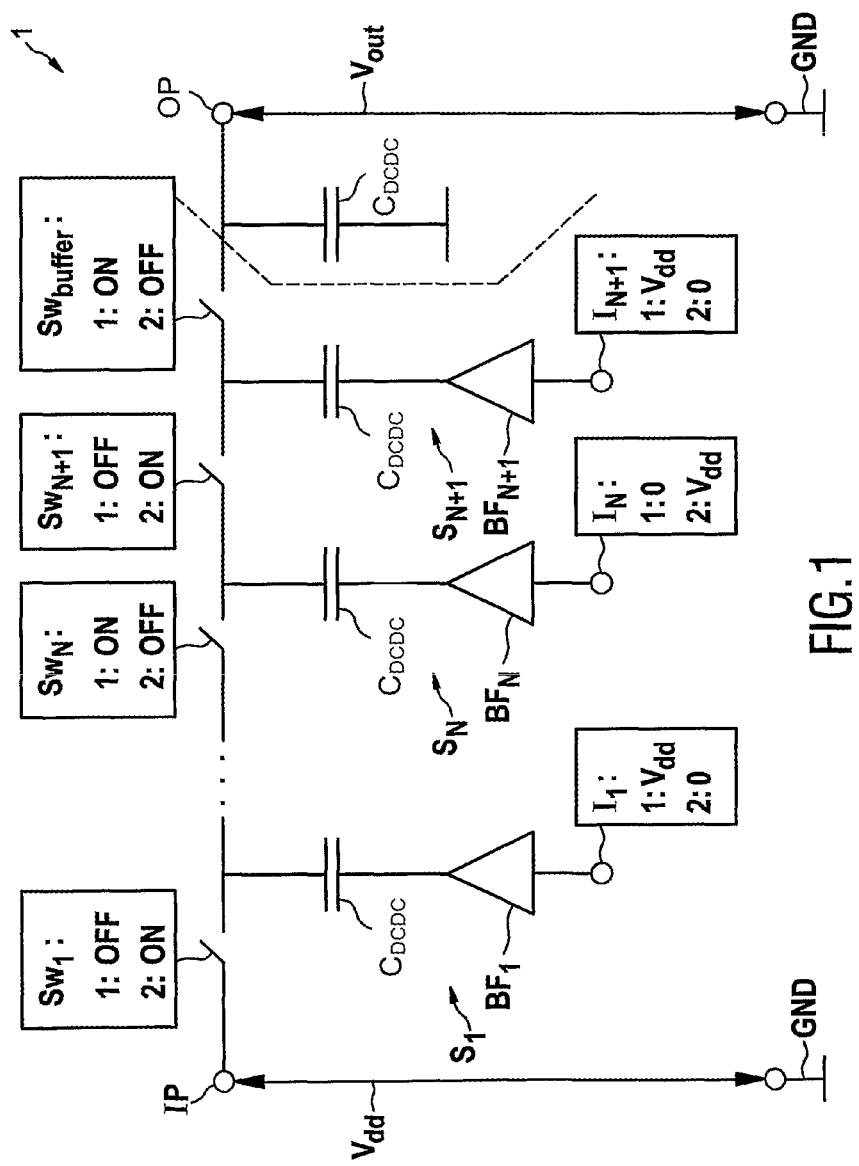
FIG. 1 shows a schematic (known) charge pump architecture.

FIG. 1 shows a programmable charge pump to which the invention can be applied. The description below is based on a voltage up-converter. However, the same principles apply to a voltage down-converter. In a voltage down-converter, charge sharing between stages is used.

A programmable charge pump 1 has a series of stages $S_1 \ldots S_N, S_{N+1}$ etc. each containing a capacitor $C_{DCDC}$ as a charge storage element, a MOSFET as a switch $Sw_1 \ldots Sw_N$, $Sw_{N+1}$ etc. and a bottom plate driver as a switching means (not shown). Each respective charge pump further comprises a buffer $BF_1 \ldots BF_N, BF_{N+1}$ etc. with an input $I_1 \ldots I_N, I_{N+1}$ etc. for receiving a clock input signal and a voltage Vdd as indicated in the Figure.

An input voltage Vdd is generated by a voltage source between the input terminal IP and the ground terminal GND and is supplied to the charge pump device 1. The stages are connected in a cascade, one after each other. With every stage, one input supply voltage Vdd may be gained. This is true for the ideal situation of no output current. The clock may also be generated adaptively with several phases. The ideal situation has to be corrected as there are internal losses, these losses being mainly due to dissipated currents by switch resistances when in an "on" position and one or more bottom plate drivers.

A single or a plurality of bottom plate drivers are capable of actuating each of the charge pumps and in particular by operating the input terminals IP, $I_1, I_N, I_{N+1}$ etc. and the switches $Sw_1 \ldots Sw_N, Sw_{N+1}$ etc. The voltages applied to the lower capacitor electrodes are thus controlled as well as the timing of the switching. It is noted that the lower capacitor electrode does not need to be switched in the case of a voltage down-converter, and in this case the lower capacitor terminal can be connected to a fixed low voltage line. In this case, successive charge sharing along the stages a provides a regulated voltage drop.

In the simplest implementation, there are only two states, "1" and "2", which alternate, in order to provide passing of charge along the charge pump circuit. In the output stage, with a capacitor Cbuffer, the output voltage Vout is generated between the output terminal OP and the ground terminal GND.

The stages FIG. 1 and the sizing thereof are identical to each other in their construction. However, this is not the optimal case and has been chosen only to illustrate a simple design (with the advantage of a short design time).

Further developed voltage converter embodiments may preferably be designed in a different way. In particular, stages S1, S2 ... $S_N$ close to the voltage booster input may have a stronger layout than the stages closer to the output.

The switches Sw in the circuit are normally controlled in a 'digital' way, such that the ON resistance of the switch is behaving digitally. This means the ON resistance is either high (no current flowing) or low (maximum current flowing).

Figure 2:
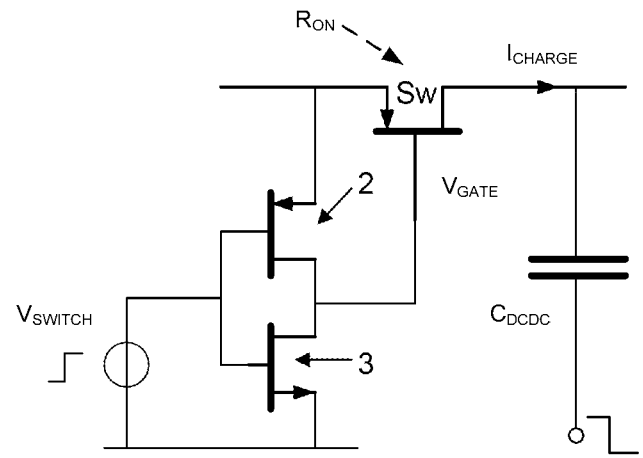
FIG. 2 is used to explain the switching characteristics of the known charge pump switches.
Figure 2:
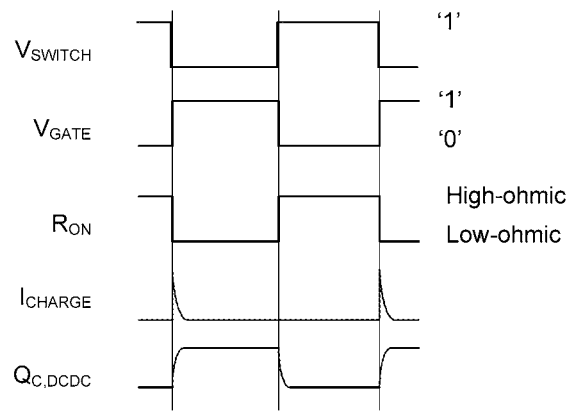

FIG. 2 shows the (schematic) standard switch control and the resulting wave forms. FIG. 2 shows the switch and capacitor for only one pump stage, and the control circuitry for operating the switch.

The circuit comprises the boost capacitor $C_{DCDC}$, the charging switch Sw through which the capacitor charging current flows, and a control circuit for controlling the charging switch by coupling the gate of the charging switch (at voltage $V_{GATE}$) to a high or low control line.

The control circuit comprises an inverter having first and second opposite type transistors 2,3 in series between the high and low control lines, with their control terminals (gates) connected together. The higher voltage transistor 2 is a PMOS device and the lower voltage transistor 3 is an NMOS device. A periodic control voltage $V_{SWITCH}$ is applied to the gates, to alternately switch on the transistors 2,3. The node between the outputs of the transistors is coupled to the gate of the charging switch and provides a gate voltage $V_{GATE}$.

As shown in the waveforms of FIG. 2, the gate voltage $V_{GATE}$ aims to follow the inverse of the control voltage $V_{SWITCH}$ as accurately as possible. This means the charging switch Sw is driven as quickly as possible, as shown by its forward resistance $R_{ON}$.

The result is a current surge through the charging switch as shown by the plot $I_{CHARGE}$. The resulting charging of the capacitor is also shown as plot $Q_{C,DCDC}$.

The invention involves limiting the current flowing through the charging switch, in one example by controlling the speed with which the switch is controlled between its on and off states.

Figure 3:
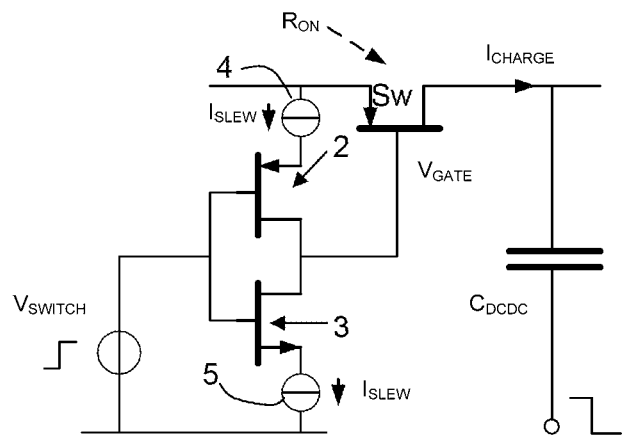
FIG. 3 shows the circuit arrangement of the invention and is used to explain the switching characteristics of the charge pump switches in accordance with the invention.
Figure 3:
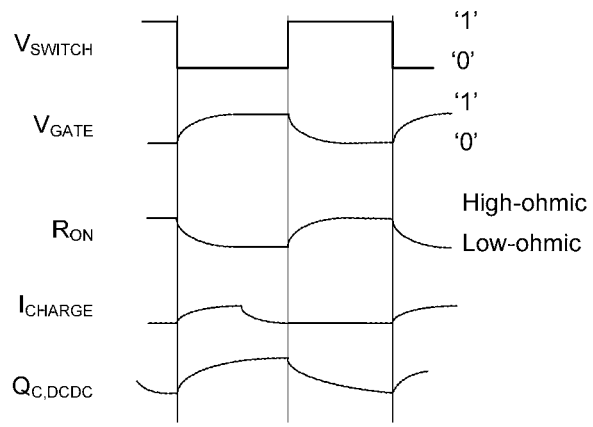

FIG. 3 shows the (schematic) switch control arrangement of the invention and the resulting wave forms. As for FIG. 2, FIG. 3 shows the switch and capacitor for only one pump stage, and the control circuitry for operating the switch.

Current limiting means is provided for limiting the current through the charging switch. In this example, the current limiting means is for limiting the current flowing to or from the gate of the charging switch, thereby to limit the switching speed of the signal applied to the gate. The current limiter is in the form of a first current limiter 4 between the high control line and the first transistor 2 and a second current limiter 5 between the low control line and the second transistor 3.

By limiting the current through the inverter responsible for controlling the gate voltage of the current switching PMOST, the gate voltage $V_{GATE}$ is controlled to fall slowly. As a result the current switch is slowly opened so the current increase is limited.

As explained above, the control circuit applies a periodic signal to the gate of the charging switch which alternates between an on command and an off command. As shown in the plot of FIG. 3, the gate voltage $V_{GATE}$ takes around 30% of the duration of the on command ($V_{SWITCH}$=0) to reach 90% of its target value. Preferably, this time period is in the range 10% to 50%.

The duration of the on command depends on the clocking frequency. This can be of the order of MHz, for example 20 MHz if on-chip capacitors are used, or lower if off-chip capacitors are used The ramping of this gate voltage is preferably designed such that turning on of the transistor is spread over the whole available clock cycle while the turn off remains quick The speed of turn on and turn off should be selected to avoid a cross conduction current between charging and discharging switches. A steep turn-off does not introduce harmonics because the capacitor voltage has stabilised at this time.

The effect of the slowed turn on is to move the timing as well as the magnitude of the peak of the charge transfer (i.e. current) to the capacitor. In the conventional approach, the peak current is located around the moment of switching, which means there is a sharp spike from zero to maximum charge transfer.

Figure 4:
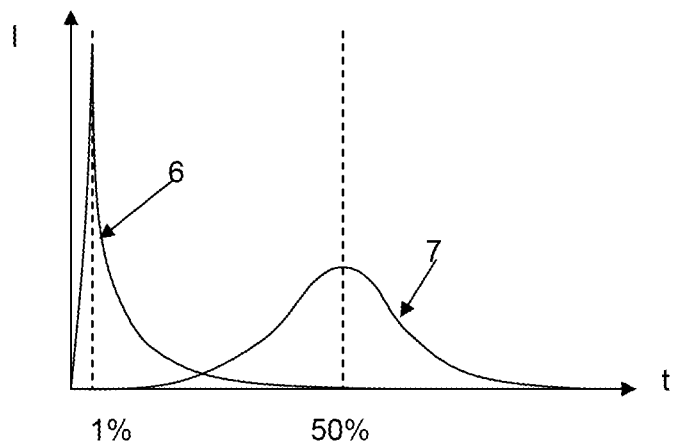
FIG. 4 shows the effect of the slow switch turn on of the invention on the charge transfer to the capacitor.

FIG. 4 shows the current (i.e. charge transfer per unit time) flowing to the capacitor for the conventional arrangement (plot 6) and for the arrangement of the invention (plot 7). The peak in the plot is moved towards 50% of the available time (i.e. the on period). The peak is shifted away from the initial turn on, so that it is at least 10% in to the on period, and is preferably in the range 30%-70%, so that gradual turn on is achieved, but completed within the available on period.

Just before the charge transfer is started, the charge current is zero. When starting the switch on, the voltage difference is large and the ON resistance is very high which results in a low current. Both the voltage and the ON resistance start to drop as the capacitor is charged (the ON resistance drops faster) which results in an increasing current. Towards the end of the transfer the voltage difference becomes so small that the current starts to decrease again.

Thus the peak current to the capacitor arises between 30% and 70% of the on period. This implementation thus provides a dynamic transition in on resistance between a high ohmic switch and a low-ohmic switch during the charge transfer.

The corresponding slow change in on resistance can also be seen in FIG. 3, as well as the reduced charging current, and slower charging of the capacitor.

Figure 5:
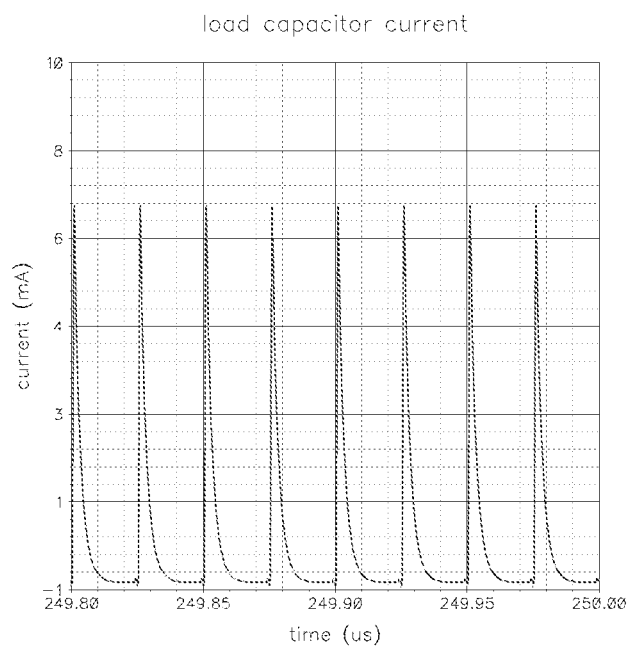
FIG. 5 shows the current spikes arising in a conventional arrangement.
Figure 6:
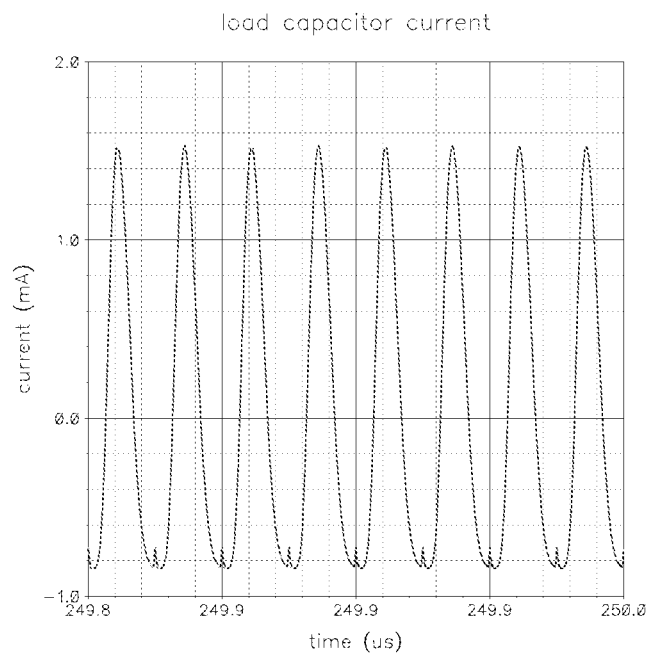
FIG. 6 shows the effect of the invention on the current spikes.

The result of this control is shown in FIGS. 5 and 6, which plot the current through the switch against time, for a series of switching events. FIG. 5 shows the conventional drive scheme, and FIG. 6 shows the drive scheme of the invention. Note that the scale of the y-axis is −1 mA to 10 mA in the FIG. 4 and −1 mA to 2 mA in FIG. 5.

The advantage of the invention is readily apparent. In the conventional method the current spikes reach up to 7 mA in this simulation set-up and are limited to a small time span. In the new method, the current amplitude is a lot smaller but the time span is bigger. In both situations, the total charge transferred is identical. As a result the performance of the DC/DC converter (efficiency) is not affected. However, the spikes on both the battery and the target supplies have been greatly reduced.

A spectral analysis of the output of the DC/DC converter demonstrates the desired reduction of harmonic content.

The invention is generally applicable to any application requiring both capacitive DC/DC voltage conversion as well as low noise on the battery and target supplies.

Figure 7:
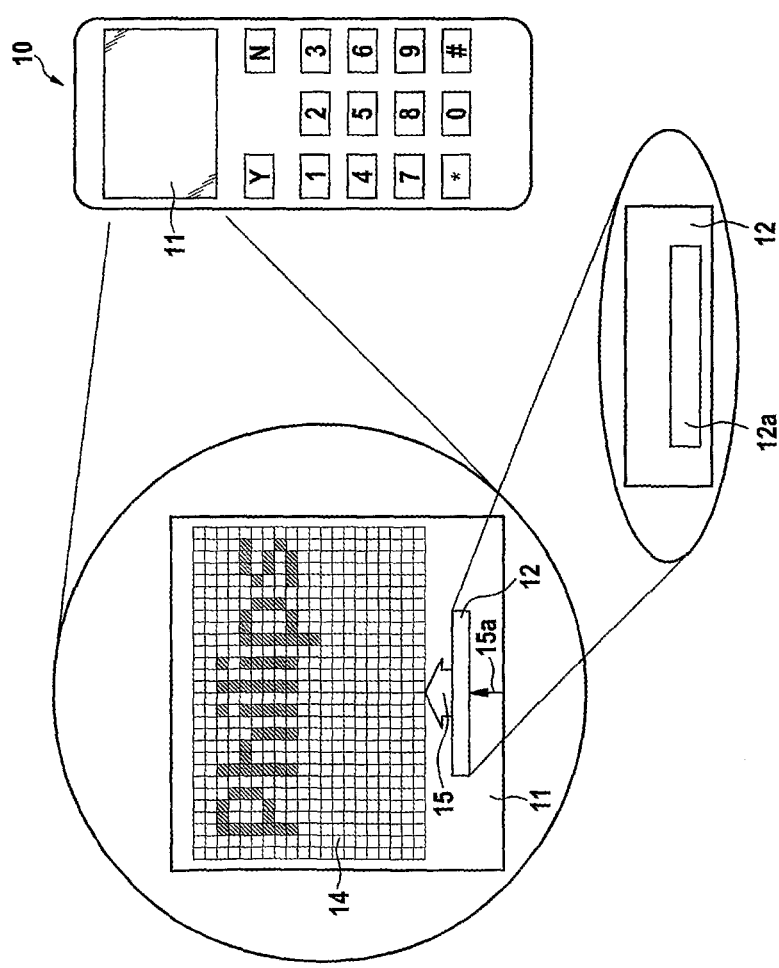
FIG. 7 shows a portable device using a driver circuit having a voltage converter of the invention.

One example is a display driver. FIG. 7 shows a portable battery operated device 10 (a mobile phone in this example) having a display 11, which may use LCD or PolyLED technology for example.

The driving circuit 12 may be part of a display module 11, either integrated built with an LCD cell 14 or formed as a separate IC (as shown) and connected (15,15*a*) with TCP or a foil. The charge pump 12*a* is part of the illustrated driver IC 12. The charge pump provides the high voltage necessary to drive the LCD cell 14. The display module may be built, for example, in small portable devices 10 such as cellular phones and Personal Digital Assistants (PDAs) as shown in FIG. 6.

The invention provides a limit to the current flow. This means the charge boost capacitor charges more slowly and the current spike at initial switch turn on is removed. A much lower peak current arises and shifted in time.

In the example above, current limiting means in the form of limiters. These limiters can be basic current sources, or devices of the same type as the driver switch (in this case an NMOS transistor at the output of an inverter). The current limiters do not need to be fast components and can therefore be slow low power devices. Current limiters are commercially available components and the specific designs does not form the subject of this invention.

The current limiter for charging (from the high voltage rail) and for discharging (to the low voltage rail) can have different designs. In particular, the turn-off speed may not need to be reduced to the same extent.

Instead of current limiters in the inverter section, a current limiter in series with the switch can be provided.

Various modifications will be apparent to those skilled in the art.

The invention claimed is:

1. A voltage converter comprising:
at least two capacitive charge pump stages, each including a capacitor, a charging switch through which a capacitor charging current is adapted to flow, and a control circuit for controlling the charging switch, the control circuit for at least one said charge pump stage having a current limiter for limiting the current through the charging switch.

2. A converter as claimed in claim 1, wherein the charging switch comprises a transistor and the current limiter is for limiting the current flowing to or from the gate of the charging switch, thereby to limit a switching speed of a signal applied to the gate.

3. A converter as claimed in claim 2, wherein the control circuit applies a periodic signal to the gate of the charging switch which alternates between an on command and an off command, and wherein a gate voltage takes at least 10% of a duration of the on command to reach 90% of its target value.

4. A converter as claimed in claim 2, wherein the control circuit applies a periodic signal to the gate of the charging switch which alternates between an on command and an off command, and wherein a peak current to the capacitor arises between 30% and 70% of the on period.

5. A converter as claimed in claim 2, wherein the control circuit comprises an inverter having first and second opposite type transistors in series between high and low control lines, with their control terminals connected together and with a node between the transistors coupled to the gate of the charging switch.

6. A converter as claimed in claim 5, wherein the current limiter comprises a first current limiter between the high control line and the first transistor and a second current limiter between the low control line and the second transistor.

7. A converter as claimed in claim 6, wherein the first and second current limiters have different limit current values, so that the on and off switching of the charging switch is controlled differently.

8. A converter as claimed in claim 5, wherein the capacitor is connected between an output of the charging switch and the low control line and a switching control signal is applied between the low control line and the control terminals of the transistors.

9. A driving circuit for a battery operated device, comprising a voltage converter as claimed in claim 1.

10. A battery operated device comprising a driving circuit as claimed in claim 9.

11. A voltage conversion method comprising:
operating at least two capacitive charge pump stages, each including a capacitor, a charging switch through which a capacitor charging current is adapted to flow, and a control circuit for controlling the charging switch, and limiting the current through the charging switch.

12. A method as claimed in claim 11, further comprising limiting the current flowing to or from a gate of the charging switch during switching, thereby limiting a switching speed of a signal applied to the gate.

13. A method as claimed in claim 12, comprising applying a periodic signal to the gate of the charging switch which alternates between an on command and an off command, and wherein a gate voltage takes at least 10% of a duration of the on command to reach 90% of its target value.

14. A method as claimed in claim 12, further comprising applying a periodic signal to the gate of the charging switch which alternates between an on command and an off command, and wherein a peak current to the capacitor arises between 30% and 70% of the on period.

* * * * *